United States Patent [19]

Reichel et al.

[11] 4,203,531
[45] May 20, 1980

[54] ULTRASONIC SOLDERING BATH HAVING AN ULTRASONIC PROBE EXTENDING INTO THE SOLDER BATH

[75] Inventors: Hilmar Reichel, Planegg; Guenter Klauke; Karl-Heinz Herting, both of Munich; Martin Pointner, Kirchseeon, all of Fed. Rep. of Germany

[73] Assignee: Siemens Aktiengesellschaft, Berlin & Munich, Fed. Rep. of Germany

[21] Appl. No.: 913,791

[22] Filed: Jun. 8, 1978

[30] Foreign Application Priority Data

Jun. 24, 1977 [DE] Fed. Rep. of Germany ....... 2728634

[51] Int. Cl.² .............................................. B23K 1/06
[52] U.S. Cl. .................................... 228/1 A; 228/36; 228/56; 118/429
[58] Field of Search .................. 228/1 R, 1 A, 36, 37, 228/56, 262; 118/400, 429

[56] References Cited

U.S. PATENT DOCUMENTS

| 3,303,983 | 2/1907 | Patrick et al. | 228/37 |
| 3,385,262 | 5/1968 | Jacke et al. | 228/56 |
| 3,752,381 | 8/1973 | Watson, Jr. | 228/36 X |
| 3,833,163 | 9/1974 | Denslow et al. | 228/36 X |
| 3,934,781 | 1/1976 | Klauke et al. | 228/37 |
| 4,047,655 | 9/1977 | McCafferty | 228/36 X |

FOREIGN PATENT DOCUMENTS

2352595 4/1977 Fed. Rep. of Germany ............. 228/36

Primary Examiner—Leon Gilden
Attorney, Agent, or Firm—Hill, Van Santen, Steadman, Chiara & Simpson

[57] ABSTRACT

An ultrasonic soldering device having a container to hold a bath of molten solder, at least one ultrasonic transducer for creating an ultrasonic wave, a probe connected to each of the transducers and means for mounting the probe to extend through a wall of the container such as a bottom wall into the bath characterized by the mounting including means for increasing and decreasing the amount of probe extending into the bath so that the end of the probe can be adjusted relative to the bath surface. Preferably, a soldering device is a so-called lift solder bath having a hermetically sealed lid provided with a shaft in which the level of bath can be raised or lifted and the probe is mounted to extend into the shaft so that as the level of solder rises in the shaft, the end of the probe can be adjusted to be just beneath the level.

8 Claims, 1 Drawing Figure

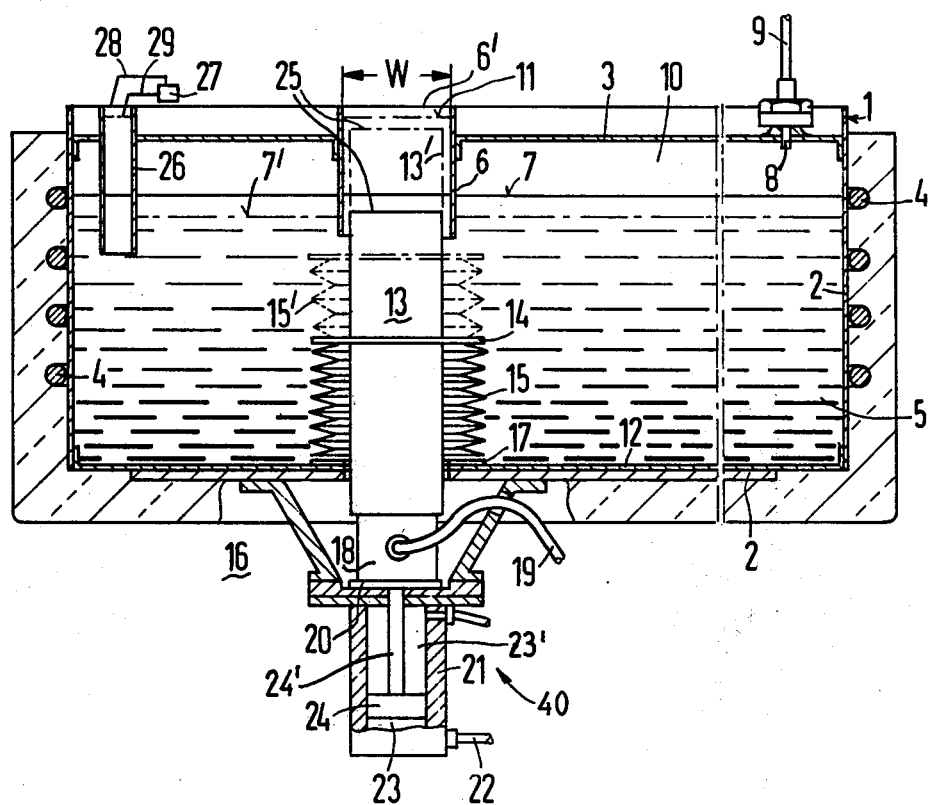

ULTRASONIC SOLDERING BATH HAVING AN ULTRASONIC PROBE EXTENDING INTO THE SOLDER BATH

BACKGROUND OF THE INVENTION

1. Field of the Invention

The present invention is directed to an ultrasonic solder bath which has a container to hold molten solder, at least one ultrasonic transducer to create ultrasonic waves, a probe connected to each of the transducers and means for mounting the probe to extend through a wall of the container into the bath which wall is preferably the bottom wall of the container.

2. Prior Art

A soldering device for a flux-free soldering operation by means of ultrasonic waves is explained and described in U.S. Pat. No. 3,385,262. As disclosed, the soldering device of the patent consists of a container which holds a bath of molten solder and a probe or ultrasonic horn, which extends from a source such as an ultrasonic transducer, is brought into the bath through either the bottom wall of the container or, in one embodiment, through a side wall. The ultrasonic waves, which are generated in the ultrasonic transducer, are carried by the probe or horn and adjacent the end surface create an intense activation in the molten solder which causes the improvement of the wettability of the parts to be soldered due to cavitation of the solder. One of the problems discussed in the patent is the problem with the contamination of the bath due to the formation of oxides on the surface of the bath which contamination is the problem with all open solder baths.

One approach for dealing with the contamination such as oxides at the surface of the solder bath is disclosed in FIG. 3 of German Pat. No. 23 52 595. As disclosed in this German patent, the bath of solder is contained in a container, which is closed on all sides with the lid of the container being provided with a chimney or shaft, which extends directly into the bath of molten solder. By means of an application of a pressurized gas such as an inert covering gas, it is possible to elevate or lift the level of the solder in the chimney or shaft in such a fashion that the solder level forms a kind of meniscus at the upper end of the chimney. If the gas pressure acting on the solder is reduced, the solder level will fall back again. The solder zone therefore can be the plane as formed by the upper edge of the chimney. Such a soldering device has shown great merit. If one positions an imersion probe of an ultrasonic transducer in the chimney or shaft in order to improve the wettability of the parts to be soldered to each other, there is however the disadvantage that tin oxide will be deposited on the surface of the probe when the level of solder is reduced. If one positions the end of the imersion probe of the ultrasonic transducer below the lowest level of the solder in the shaft, the activity of the ultrasonic waves is thereby reduced. This has a result that it is no longer possible to freely raise and lower the solder level in the chimney as desired.

SUMMARY OF THE INVENTION

The present invention is directed to providing an improvement for an ultrasonic soldering device that overcomes the above mentioned disadvantages and creates an ultrasonic activated solder bath which has sound emitting areas of the probes being adjustably disposed in the bath and to the solder level of the bath.

To accomplish these goals, an ultrasonic soldering device having a container to hold a bath of molten solder, at least one ultrasonic transducer for creating ultrasonic waves, a probe being connected to each of the transducers and having a sound emitting surface and means for mounting each probe to extend through the wall of the container into the bath has the improvement comprising the means for mounting including means for changing or varying the amount of the probe extending into the bath so that the position of the emitting surface of the probe in the bath can be varied or changed within a desired range. Preferably, the soldering device has a container which is hermetically sealed at the top by a lid, which is provided with a shaft extending therethrough, the device has means for applying pressure on the surface of the bath of the solder so that the level of solder in the shaft can be changed and the mounting means positions the probe to extend through the bottom wall of the container with the probe being aligned with the shaft so that varying or changing the amount of the probe extending into the bath positions the sound emitting end surface of the probe at different heights within said shaft. Thus, the level of the solder in the shaft can be changed without incurring the problems of an oxide formation on the sound emitting surface of the probe.

Another important feature of the invention is that the mounting means includes a heat resistant bellows, which is telescopically received on the probe and has one end secured thereto and the other end secured to the container so that the means for changing the position can be disposed outside of the bath with the ultrasonic transducer. Preferably, the bellows is of a solder repelling material such as stainless steel.

If the solder bath is a so-called lift bath having a shaft extending through a lid in which the level of the solder is changed, the present invention is particularly advantageous in enabling the sound transmitting surface of the probe to be adjusted in height relative to the changes in height of the solder in the shaft. If the solder bath level is raised, the probe can be moved axially into the bath so that the sound emitting surface remains at all times 3 to 5 mm below the surface level of the solder bath in the shaft section.

BRIEF DESCRIPTION OF THE DRAWING

The FIGURE is a cross-sectional view with portions in elevation for purposes of illustration of an ultrasonic soldering device in accordance with the present invention.

DESCRIPTION OF THE PREFERRED EMBODIMENT

The principles of the present invention are particularly useful in an ultrasonic soldering bath generally indicated at 1 in the figure. The device 1 may be a so-called lift solder dip bath and consists in general of a box-like container 2, which can be covered by a cover plate or lid 3 which is attached thereto. The container 2 is provided with a heating element 4 to maintain a bath 5 of solder in a molten state. To maintain the temperature in the bath 5, the container's outer surface is covered with an insulating material.

The cover 3 has a shaft or chimney 6, which extends therethrough and approximately 2 cm below a surface 7 of the bath 5 of molten solder. The opening or cross section of the shaft has a length and width, such as width W, which are selected in view of the dimensions of the component which is to be soldered therein. To apply pressure on the surface 7, the cover 3 is provided with an opening 8 which has appropriate fitting to be connected to a tubing 9 which extends to a source of pressurized gas such as an inert gas. An example of pressurized gas is nitrogen which, when applied in the cavity or space 10 above the level 7 of the bath 5, forces the level 7 to a level 7' indicated in chain line so that solder is displaced in the shaft or chimney 6, for example, to a new level shown by chain line 11, which is adjacent an upper edge 6' of the shaft 6.

To provide ultrasonic waves in the bath 5, the ultrasonic soldering device 1 is provided with an ultrasonic transducer 18, which converts signals received through a shielded cable 19 from a source (not illustrated) into sonic waves which are transmitted by a probe or sonotrode 13 which is connected thereto. Mounting means 40 mounts the transducer 18 on the exterior of the container 2 with the probe 13 extending through an opening 20 in a bottom wall 12 of the container 2. As illustrated, the mounting means 40 positions the probe 13 so that a sound emitting surface or end 25 is positioned in the shaft or chimney 6. The mounting means 40 includes means for moving the probe 13 into and out of the bath 5 so that the probe 13 can be moved to a position 13' with the sound emitting surface 25 just below the level 11 of the solder bath in the shaft 6. The means for changing or varying the amount of the probe extending into the bath is illustrated as a double acting piston cylinder 21 having a piston 24 connected by a piston rod 24' to a floor plate 20 of the transducer 18. Thus, when a pressurized fluid, such as air or oil, is introduced through conduit 22 into a cylinder space 23, the piston 24 is raised to lift the transducer 18 and the probe 13 to the position of probe illustrated as 13' in broken lines. By applying pressure in the chamber 23' to act on the opposite surface of the piston 24, the probe 13 can be brought to the position illustrated in bold lines.

To provide a seal and to enable positioning both the transducer 18 and the piston cylinder 21 on the outside 16 of the bath 5, a heat resistant bellows 15, which consists of a material which is not only resistant against the liquid solder but also solder repellant and preferably such as stainless steel, is telescopically received on the probe 13 with one end being hermetically sealed to flange 14, which is located on an acoustical nodal plane of the probe. Another end of the bellows 15 is hermetically secured to a ring seal 17, which is applied on the bottom 12 of the container so that the bath 5 is sealed from the outside 16 of the container 2. Thus, when the piston 24 is used to move the sound emitting surface 25 to just beneath the level 11, the bellows 15 will be stretched to the position 15' which is illustrated in broken lines.

With the bath 5 in a molten condition, a pressure applied in chamber 10 will raise the bath to level 11 in the shaft 6. Fluid applied to chamber 23 causes the piston 24 to raise the probe 13 to position 13' and the sound emitting surface 25 will be positioned just below the level 11. Soldering can take place by switching on the ultrasonic transducer 18 and placing a component or part in the solder bath 5 by either dipping the part to be soldered into the solder shaft 6 or by resting the part to be soldered on the upper edge 6' of the shaft 6. After solder having been completed, the probe 13 is lowered to the normal position shown in bold lines by applying pressure in chamber 23' to act on the opposite side of the piston 24 and then the solder level in the shaft 6 is lowered by releasing the pressure of the gas in chamber 10. The sound emitting surface 25 of the probe 13 therefore will always remain below the surfaces 11 or 7 of the bath 5 of solder so that it will not be contaminated by oxides.

In order to control the level of the bath 5, additional solder can be added through a shaft 26, which extends through the lid 3. As illustrated, the shaft 26 also has a level indicator 27. The level indicator 27 is equipped as illustrated with two electrodes 28 and 29, which are arranged in such a fashion as to selectively indicate when the level has reached the level 11 or the level of the upper edge 6' of the shaft 6.

It should be noted that the probe 13 can have any desired shape and that the shaft 6 can also be of any desired cross-sectional configuration. It should also be noted that the double acting piston 24 can be replaced by equivalent structures such as a single acting piston which is urged to one position by a resilient spring.

Although various minor modifications may be suggested by those versed in the art, it should be understood that we wish to embody within the scope of the patent warranted hereon all such modifications as reasonably and properly come within the scope of our contribution to the art.

We claim:

1. In an ultrasonic soldering device having a container to hold a bath of molten solder, an ultrasonic transducer for creating ultrasonic waves, a probe being connected to the transducer and having a sound emitting surface, and means for mounting the probe to extend through a wall of the container with the emitting surface being disposed in the bath, the improvements comprising the container being hermetically sealed at the top by a lid provided with a shaft extending therethrough, said device having means for applying pressure on the surface of the bath of solder material so that the level of the solder in the shaft can be changed, said means for mounting positioning the probe to extend through a bottom wall of the container with the probe being aligned with said shaft and including means for changing the amount of the probe extending into the bath so that the position of the sound emitting surface of the probe in the bath can be changed to be at different heights in said shaft.

2. In an ultrasonic soldering device according to claim 1, wherein the means for mounting includes a bellows surrounding a portion of said probe, said bellows having one end sealed to the probe and the other end sealed to the wall of the container to form a seal for the mounting means.

3. In an ultrasonic soldering device according to claim 2, wherein the probe has a flange disposed at an acoustical nodal plane, said one end of the bellows being sealed to said flange and the other end of said bellows being secured to a flange ring which is sealed to the container of the solder bath.

4. In an ultrasonic soldering device according to claim 2, wherein said bellows is made of stainless steel.

5. In an ultrasonic soldering device according to claim 1, wherein said means for changing the amount of the probe extending into the solder bath includes a piston having a piston rod secured to the transducer and probe so that the entire transducer and probe is shifted as the position of the sound emitting surface of the probe is moved in the bath.

6. In an ultrasonic soldering device according to claim 1, wherein said means for mounting includes a bellows surrounding a portion of said probe, said bellows having one end secured to said probe and the other end secured to a bottom wall of the container to form a sealed connection between the probe and the container for the mounting means.

7. In an ultrasonic soldering device according to claim 6, wherein said bellows is made of stainless steel and wherein the probe has a flange disposed at an acoustical nodal plane, said one end of the bellows being secured to said flange and said other end being secured to a flange ring secured to the bottom wall of the container.

8. In an ultrasonic soldering device according to claim 1, wherein said means for changing the amount comprises a lifting mechanism having a piston rod connected to the transducer for axially moving the transducer and probe relative to the container.

* * * * *